(12) United States Patent
Tsuji (10) Patent No.: US 12,007,300 B2
(45) Date of Patent: Jun. 11, 2024

(54) GAS SENSOR (71) Applicant: DENSO CORPORATION, Kariya (JP)

(72) Inventor: Nobuyuki Tsuji, Kariya (JP)

(73) Assignee: DENSO CORPORATION, Kariya (JP)

( * ) Notice: Subject to any disclaimer, the term of this patent is extended or adjusted under 35 U.S.C. 154(b) by 244 days.

(21) Appl. No.: 17/587,942

(22) Filed: Jan. 28, 2022

(65) Prior Publication Data

US 2022/0155178 A1 May 19, 2022

Related U.S. Application Data

(63) Continuation of application No. PCT/JP2020/024541, filed on Jun. 23, 2020.

(30) Foreign Application Priority Data

Jul. 31, 2019 (JP) ................. 2019-141449

(51) Int. Cl.
*G01M 15/10* (2006.01)
*G01N 27/407* (2006.01)
*F02D 41/14* (2006.01)

(52) U.S. Cl.
CPC ...... *G01M 15/102* (2013.01); *G01N 27/4078* (2013.01); *F01N 2560/02* (2013.01);
(Continued)

(58) Field of Classification Search
CPC .............. G01M 15/102; G01M 15/10; G01N 27/4078; G01N 27/407; F01N 2560/02; F02D 41/1438; F02D 41/222
See application file for complete search history.

(56) References Cited

U.S. PATENT DOCUMENTS 5,886,248 A * 3/1999 Paulus ............... G01N 27/4062
73/23.31
2007/0113617 A1 5/2007 Yamauchi
(Continued)

FOREIGN PATENT DOCUMENTS

JP 10-10082 1/1998
JP 2017020984 A * 1/2017 ......... G01N 27/4077

OTHER PUBLICATIONS

International Search Report dated Aug. 11, 2020 issued for International Application No. PCT/JP2020/024541 (2 pages).

*Primary Examiner* — Peter J Macchiarolo
*Assistant Examiner* — John M Royston
(74) *Attorney, Agent, or Firm* — Nixon & Vanderhye P.C.

(57) ABSTRACT

A gas sensor includes a housing including a locking step part, a sensor body including a locked part locked to the locking step part, a sealing member filled between an inner periphery of the housing and an outer periphery of the sensor body on a base end side of the locked part, an insulating member disposed on the base end side of the sealing member, and a circular disc spring pressing a base end surface of the insulating member. The housing includes a caulking part caulking the circular disc spring to cover the circular disc spring. The elastically compressed circular disc spring is disposed between the caulking part and the insulating member. At least part of a base end side pressing part, at which the caulking part presses the circular disc spring, is disposed between an inner and outer periphery edges of the base end surface of the insulating member.

4 Claims, 11 Drawing Sheets

(52) U.S. Cl.
CPC ......... *F02D 41/1438* (2013.01); *G01M 15/10* (2013.01); *G01N 27/407* (2013.01)

(56)     References Cited

U.S. PATENT DOCUMENTS

| | | | |
|---|---|---|---|
| 2012/0036929 A1* | 2/2012 | Fujita | G01D 11/245 |
| | | | 73/431 |
| 2013/0305811 A1 | 11/2013 | Noda et al. | |
| 2015/0027888 A1* | 1/2015 | Soyez | G01N 27/4078 |
| | | | 277/627 |
| 2015/0128681 A1* | 5/2015 | Stier | H02G 15/003 |
| | | | 73/23.31 |
| 2017/0138895 A1 | 5/2017 | Iwamoto et al. | |

\* cited by examiner

GAS SENSOR

CROSS-REFERENCE TO RELATED APPLICATION

This application is the U.S. continuation application of International Application No. PCT/JP2020/024541 filed Jun. 23, 2020 which designated the U.S. and claims the benefit of Japanese Patent Application No. 2019-141449 filed on Jul. 31, 2019, the entire contents of each of which are hereby incorporated by reference.

BACKGROUND

Technical Field

The present disclosure relates to a gas sensor.

Related Art

Various gas sensors have been developed which are disposed to, for example, an exhaust system of an internal-combustion engine to detect a specific gas concentration in a gas to be measured, such as an exhaust gas.

SUMMARY

An aspect of the present disclosure provides a gas sensor that includes:
a housing that includes a locking step part formed on an inner periphery of the housing;
a sensor body that includes a locked part locked to the locking step part from a base end side and is held inside the housing;
a sealing member that is filled between the inner periphery of the housing and an outer periphery of the sensor body on the base end side of the locked part;
an insulating member that is disposed between the inner periphery of the housing and the outer periphery of the sensor body on the base end side of the sealing member; and
a circular disc spring that presses a base end surface of the insulating member, wherein
the housing includes a caulking part that caulks the circular disc spring so as to cover the circular disc spring from the base end side,
the circular disc spring is disposed between the caulking part and the insulating member in a state in which the circular disc spring is elastically compressed,
at least part of a base end side pressing part, at which the caulking part presses the circular disc spring, is disposed between an inner periphery edge and an outer periphery edge of the base end surface of the insulating member,
an outer periphery edge of the base end side pressing part is formed on an outer periphery side with respect to an inner periphery edge of a tip end side pressing part at which the circular disc spring presses the base end surface of the insulating member, and
an inner periphery edge of the base end side pressing part is disposed on an inner periphery side with respect to the outer periphery edge of the base end surface of the insulating member, and
a wedge-shaped gap is formed between the circular disc spring and the base end surface of the insulating member on the outer periphery side of the tip end side pressing part.

In the above gas sensor, at least part of the base end side pressing part is disposed between the inner periphery edge and the outer periphery edge of the base end surface of the insulating member. Hence, when the gas sensor is assembled, the circular disc spring can be prevented from being locally pressed to a corner of the base end surface of the insulating member, by pressing force of the caulking part for pressing the circular disc spring. Hence, the pressing force of the caulking part can be great while the insulating member is prevented from being damaged. Accordingly, the sealing properties of the sealing part can be easily improved.

As described above, according to the aspect, a gas sensor can be provided in which sealing properties of a sealing part can be easily improved.

BRIEF DESCRIPTION OF THE DRAWINGS

In the accompanying drawings.

DETAILED DESCRIPTION OF THE PREFERRED EMBODIMENTS

Various gas sensors have been developed which are disposed to, for example, an exhaust system of an internal-combustion engine to detect a specific gas concentration in a gas to be measured, such as an exhaust gas. For example, in the gas sensor disclosed in JP-A-10-10082, a sensor element is held inside a housing, and a seal material is interposed between the housing and the sensor element to ensure sealing properties therebetween.

In order to improve the sealing properties of the seal material, the seal material is pressed toward a tip end side by a circular spring via an insulating member disposed on a base end side of the seal material.

The gas sensor disclosed in JP-A-10-10082 has the following problems.

In the gas sensor, a circumference of a base end part of the housing (hereinafter, referred to as a caulking part) is caulked to press part of the circular spring toward the tip end side.

The caulking part presses the circular spring toward an outer periphery side with respect to an outer periphery edge of the insulating member or an inner periphery side with respect to an inner periphery edge of the insulating member. Hence, at the time of assembling the gas sensor, when the caulking part is deformed to press the circular spring toward the tip end side, the circular spring is pressed to a corner of an outer periphery edge or an inner periphery edge of a base end surface of the insulating member. Thus, a large load is locally applied to the insulating member easily. Hence, in order to prevent the insulating member from being damaged at the time of assembly, pressing force against the insulating member by the caulking part is required to be suppressed. Accordingly, sealing properties of a sealing part is difficult to improve.

The present disclosure provides a gas sensor in which sealing properties of a sealing part can be easily improved.

First Embodiment

An embodiment of a gas sensor will be described with reference to FIG. 1 to FIG. 8.

Figure 1:
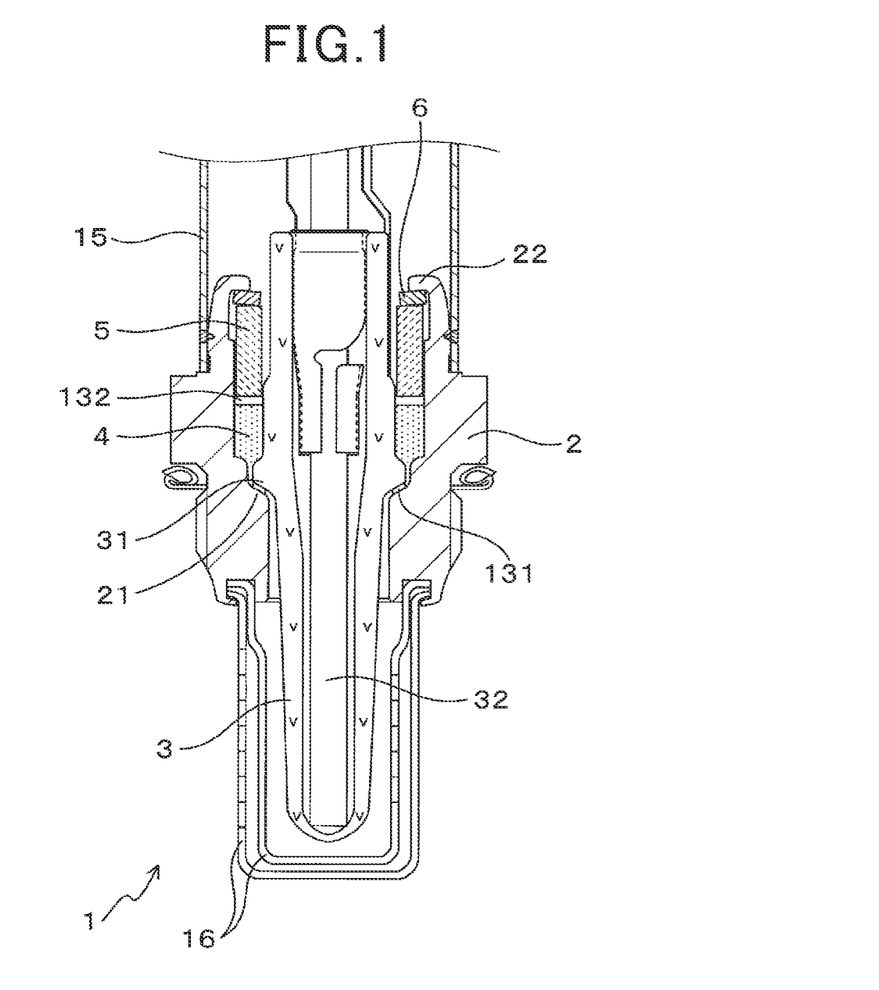
FIG. 1 is a sectional view of part of a gas sensor according to a first embodiment.

As shown in FIG. 1, a gas sensor 1 of the present embodiment includes a housing 2, a sensor body 3, a sealing member 4, an insulating member 5, and a circular disc spring 6.

The housing 2 includes a locking step part 21 formed on the whole inner periphery thereof. The sensor body 3 includes a locked part 31 that is locked to the locking step part 21 from the base end side. The sensor body 3 is held inside the housing 2. The sealing member 4 is filled between the inner periphery of the housing 2 and the outer periphery of the sensor body 3 on the base end side of the locked part 31. The insulating member 5 is disposed between the inner periphery of the housing 2 and the outer periphery of the sensor body 3 on the base end side of the sealing member 4. The circular disc spring 6 presses a base end surface 51 of the insulating member 5.

Figure 2:
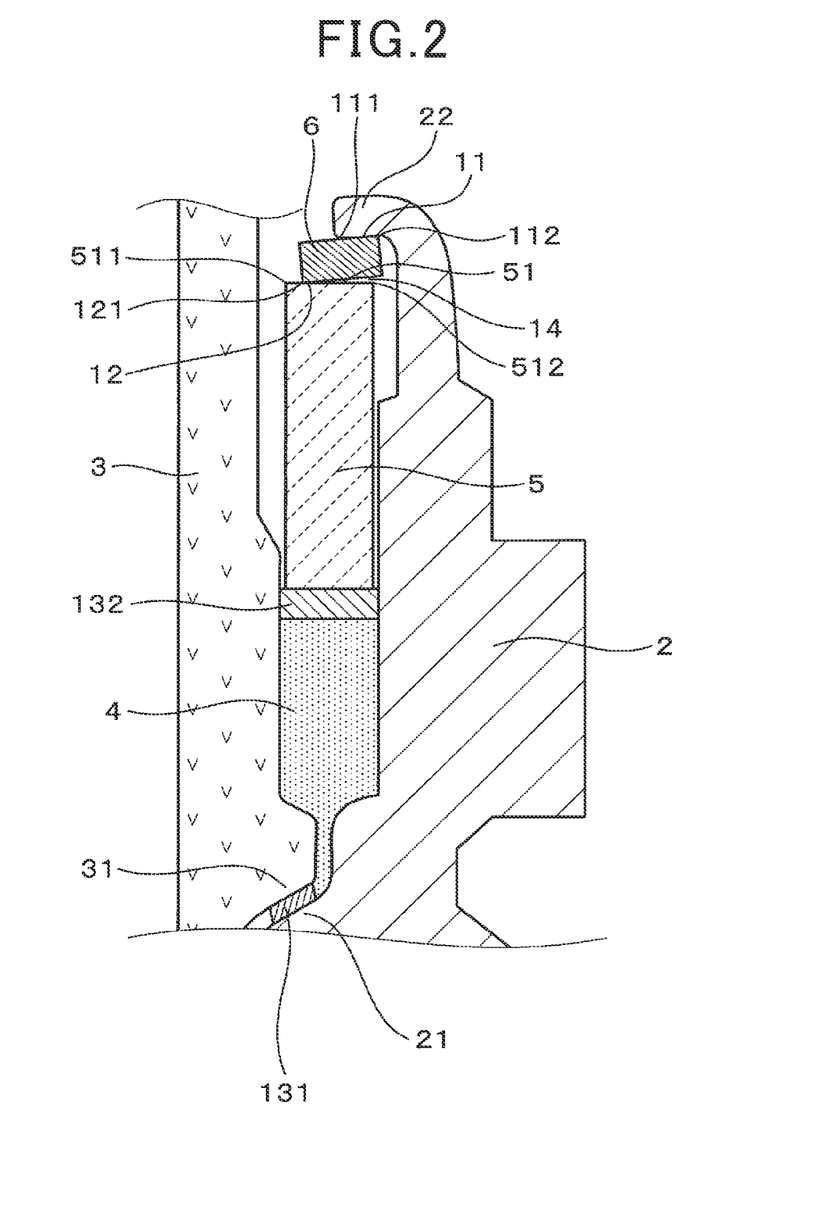
FIG. 2 is a sectional view of a portion in the vicinity of a sealing member according to the first embodiment.

As shown in FIG. 1 and FIG. 2, the housing 2 includes a caulking part 22 that caulks the circular disc spring 6 so as to cover the circular disc spring 6 from the base end side. The circular disc spring 6 is disposed between the caulking part 22 and the insulating member 5 in a state in which the circular disc spring 6 is elastically compressed. At least part of a base end side pressing part 11, at which the caulking part 22 presses the circular disc spring 6, is disposed between an inner periphery edge 511 and an outer periphery edge 512 of the base end surface 51 of the insulating member 5.

The base end side pressing part 11 is a part at which the caulking part 22 presses the circular disc spring 6. The base end side pressing part 11 includes a part at which the caulking part 22 can press the circular disc spring 6 at the time of assembly described later. For example, in a completed product of the gas sensor 1, a small gap may be generated between a portion of the caulking part 22 on the inner periphery edge side and the circular disc spring 6. Also in such a case, facing portions of the caulking part 22 and the circular disc spring 6 facing in the axial direction via the small gap are portions to which a pressing load is applied in a caulking process (refer to FIG. 5). Hence, the facing portions serve as part of the base end side pressing part 11.

In the present embodiment, the sensor body 3 is a sensor element including a sensing part. The sensor body 3 is made of ceramic such as zirconia. As shown in FIG. 1, the sensor body 3 is a cup-shaped sensor element that is closed on the tip end side thereof and is opened on the base end side thereof. A heater 32 for heating the sensor element is disposed inside the sensor element. The locked part 31 is formed by expanding a diameter of part of the outer periphery of the sensor body 3. The locked part 31 of the sensor body 3 is locked to the locking step part 21 of the housing 2 via a circular first gasket 131.

The housing 2 is made of a metallic member such as stainless steel. On the base end side of the locked part 31 of the sensor body 3, a cylindrical gap is formed between the outer periphery of the sensor body 3 and the inner periphery of the housing 2. The sealing member 4 is filled in the gap. The sealing member 4 may be made of, for example, talc.

In the present embodiment, a circular second gasket 132 is interposed between the sealing member 4 and the insulating member 5. However, the insulating member 5 may be directly brought into contact with the sealing member 4 without the second gasket 132. Herein, the axial direction of the gas sensor 1 is also simply referred to as an axial direction. In the axial direction, the side on which the gas sensor 1 is inserted into an exhaust system is referred to as the tip end side, and the side opposite to the tip end side is referred to as the base end side.

The insulating member 5 is a ceramic compact such as alumina. The insulating member 5 has a cylindrical shape. The base end surface 51 of the insulating member 5 is flat and substantially perpendicular to the axial direction.

The circular disc spring 6 is disposed on the base end surface 51 of the insulating member 5. The caulking part 22 of the housing 2 is formed so as to support the circular disc spring 6 from the base end side. The caulking part 22 presses the circular disc spring 6 at the base end side pressing part 11. The circular disc spring 6 is made of a metallic member such as stainless steel. The circular disc spring 6 is preferably a high-tension material. The circular disc spring 6 is preferably configured by an alloy which has been subjected to a precipitation hardening treatment. As the high-tension material, for example, Cr—Ni based SUS 631, or Cr—Ni—Fe based alloy NCF718 can be used. The high-tension material is a spring material having high tensile strength. Mechanical properties of a material of the circular disc spring 6 preferably include tensile strength of 800 MPa or more and proof stress of 500 N/mm$^2$ or more.

Figure 3:
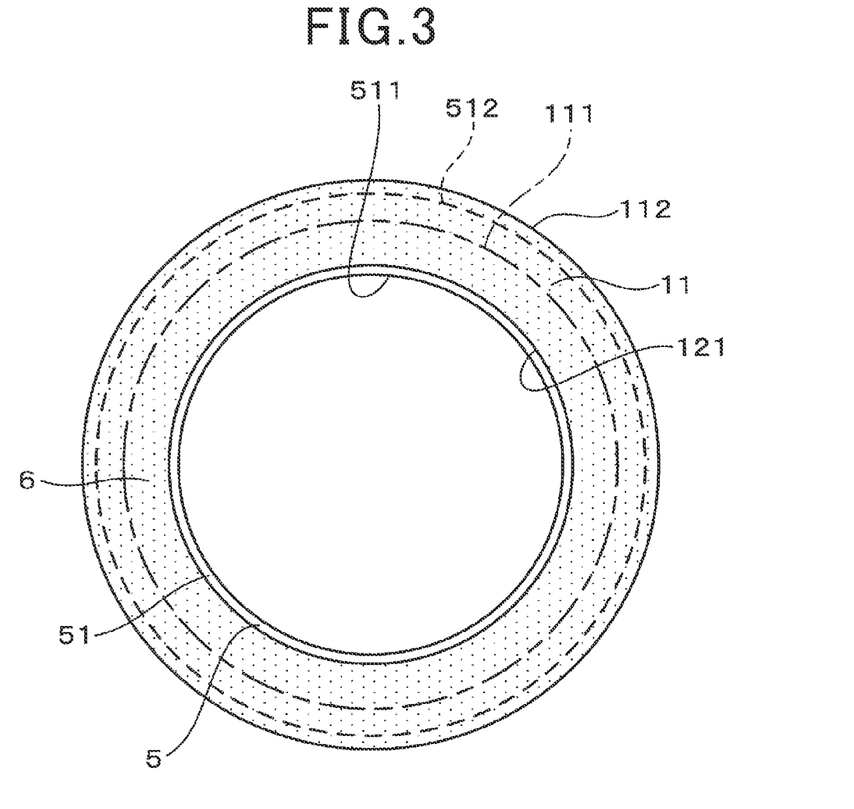
FIG. 3 is a view illustrating a positional relationship among a circular disc spring, an insulating member, and a base end side pressing part viewed in an axial direction according to the first embodiment.

As shown in FIG. 2 and FIG. 3, an outer periphery edge 112 of the base end side pressing part 11 is formed on the outer periphery side with respect to an inner periphery edge 121 of a tip end side pressing part 12. The tip end side pressing part 12 is a part at which the circular disc spring 6 presses the base end surface 51 of the insulating member 5. An inner periphery edge 111 of the base end side pressing part 11 is disposed on the inner periphery side with respect to the outer periphery edge 512 of the base end surface 51 of the insulating member 5.

Figure 4:
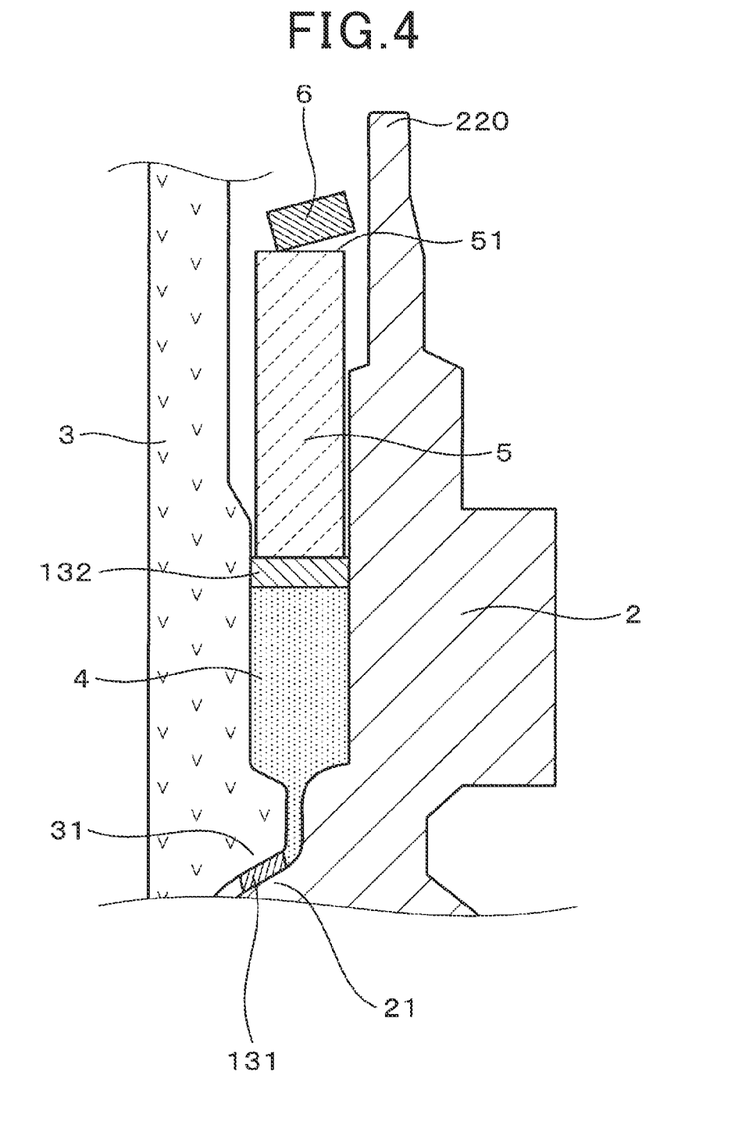
FIG. 4 is a sectional view illustrating a state before a caulking part is formed according to the first embodiment.

That is, in the present embodiment, the circular disc spring 6 is inclined, in a free state, toward the base end side in the axial direction from the inner periphery side to the outer periphery (refer to FIG. 4). Accordingly, as shown in FIG. 2, in a state in which the circular disc spring 6 is fitted to the gas sensor 1, a portion of the circular disc spring 6 in the vicinity of the inner periphery edge serves as the tip end side pressing part 12, and a portion of the circular disc spring 6 in the vicinity of the outer periphery edge serves as the base end side pressing part 11. Hence, as shown in FIG. 2 and FIG. 3, the outer periphery edge 112 of the base end side pressing part 11 is formed on the outer periphery side with respect to the inner periphery edge 121 of the tip end side pressing part 12.

In addition, the inner periphery edge 111 of the base end side pressing part 11 is disposed on the inner periphery side with respect to the outer periphery edge 512 of the base end surface 51 of the insulating member 5. Thus, when viewed in the axial direction, at least part of the base end side pressing part 11 overlaps with the base end surface 51. In the present embodiment, when viewed in the axial direction, the outer periphery edge 112 of the base end side pressing part 11 is disposed on the outer periphery side with respect to the outer periphery edge 512 of the base end surface 51. That is, when viewed in the axial direction, part of the base end side pressing part 11 overlaps with the base end surface 51, and another part of the base end side pressing part 11 (i.e., part of the base end side pressing part 11 on the outer periphery side) does not overlap with the base end surface 51.

In the present embodiment, the outer periphery edge of the circular disc spring 6 is disposed on outer periphery side with respect to the outer periphery edge 512 of the base end surface 51 of the insulating member 5. The outer periphery edge 112 of the base end side pressing part 11 is disposed on the outer periphery side with respect to the outer periphery edge 512 of the base end surface 51 of the insulating member 5. In addition, in the present embodiment, when viewed in the axial direction, part of the base end side pressing part 11 also overlaps with the sealing member 4.

As shown in FIG. 2, a wedge-shaped gap 14 is formed between the circular disc spring 6 and the base end surface 51 of the insulating member 5 on the outer periphery side of the tip end side pressing part 12.

As shown in FIG. 1, a tip end side cover 16, which is formed so as to cover the sensor body 3, is fixed on the tip end side of the housing 2. A substantially cylindrical base end side cover 15 is fixed on the base end side of the housing 2. The base end side cover 15 is fixed to the outer periphery surface of the housing 2 by welding or the like on the outer periphery side of the caulking part 22.

Next, an example of a method of fitting the sensor body 3 to the housing 2 will be described.

When the housing 2 is fitted to the sensor body 3, the sensor body 3 is inserted inside the housing 2 from the base end side along the axial direction. At this time, as shown in FIG. 4, a portion 220, which serves as the caulking part 22, of a base end part of the housing 2 stands along the axial direction.

The locked part 31 of the sensor body 3 is locked to the locking step part 21 of the housing 2 via the first gasket 131. Then, the sealing member 4 is filled in a circular gap between the housing 2 and the sensor body 3 on the base end side of the locked part 31. Furthermore, the second gasket 132 and the insulating member 5 are disposed in this order on the base end side. The circular disc spring 6 (refer to FIG. 7) is placed on the base end surface 51 of the insulating member 5. In this stage, the circular disc spring 6 is in a free state. The inner periphery edge of the circular disc spring 6 is brought into contact with the base end surface 51 of the insulating member 5. The circular disc spring 6 is inclined toward the base end side from the inner periphery side to outer periphery.

Figure 5:
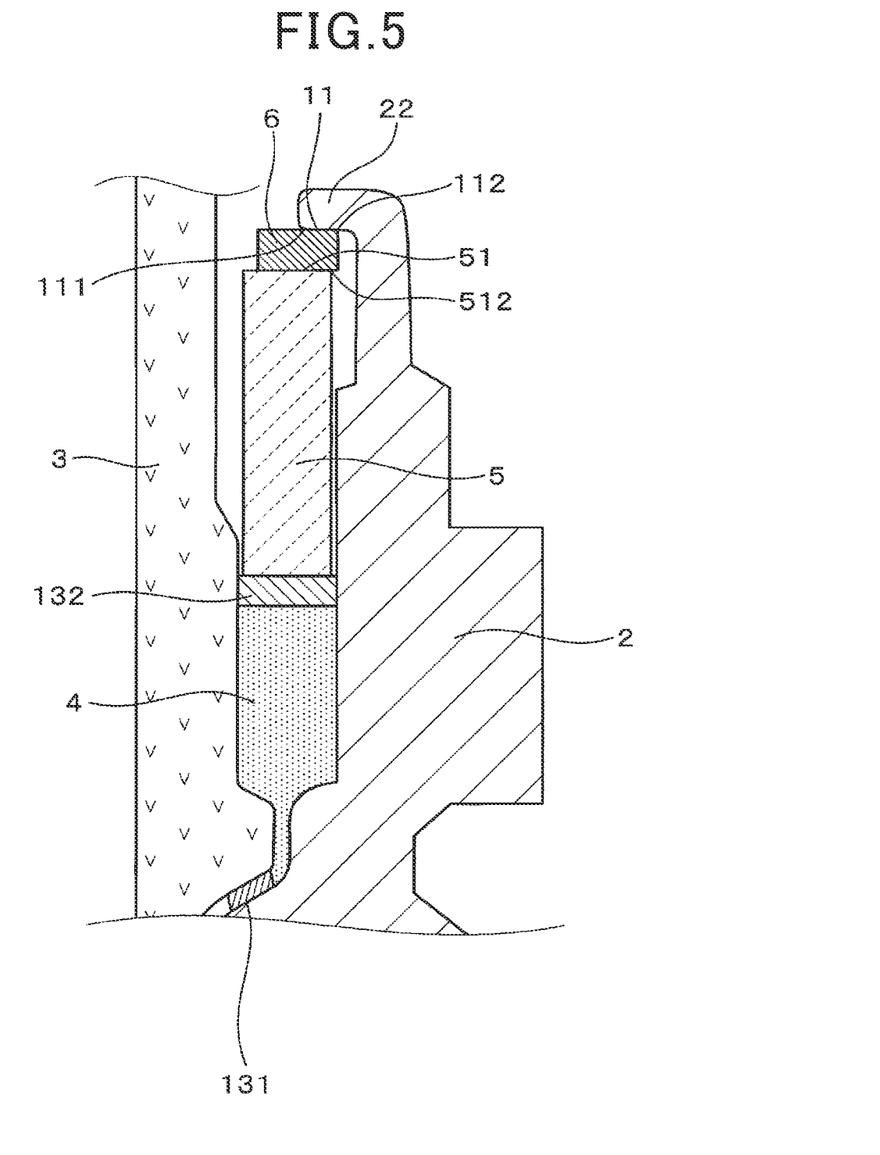
FIG. 5 is a sectional view illustrating a state in which the caulking part is pressed to a tip end side according to the first embodiment.

Next, as shown in FIG. 5, the base end part of the housing 2 is bent inward to form the caulking part 22. At this time, the caulking part 22 is pressed to the tip end side in the axial direction. That is, the caulking part 22 is pressed toward the tip end side by using a pushing jig, not shown. Thus, the caulking part 22 presses part of the circular disc spring 6 on the outer periphery side to the tip end side.

Figure 7:
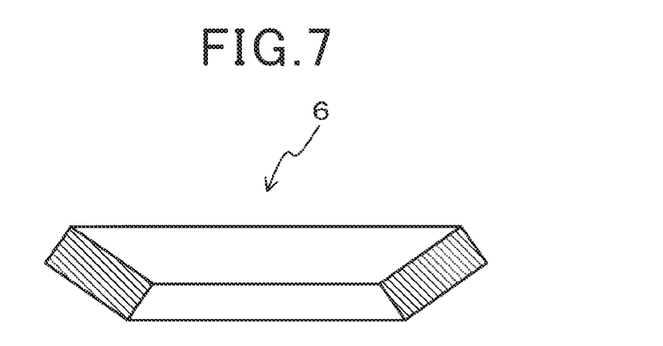
FIG. 7 is a sectional view of the circular disc spring in a free state.
Figure 8:
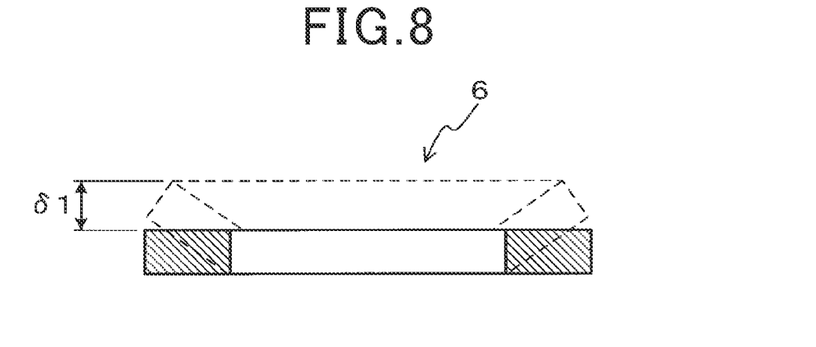
FIG. 8 is a sectional view of the circular disc spring that has been subjected to compressive deformation.

Accordingly, as shown in FIG. 5 and FIG. 8, the circular disc spring 6 is deformed from the inclined state (refer to FIG. 4 and FIG. 7) described above so as to be close to a state of being parallel to the base end surface 51 of the insulating member 5 as shown in FIG. 5 and FIG. 8. Depending on the magnitude of pushing load at this time, the circular disc spring 6 may be subjected to surface contact with the base end surface 51 of the insulating member 5. In this case, at least part of the base end side pressing part 11 at which the caulking part 22 presses the circular disc spring 6 is present inside the outer periphery edge 512 of the base end surface 51 of the insulating member 5. That is, when viewed in the axial direction, at least part of the base end side pressing part 11 overlaps with the base end surface 51 of the insulating member 5.

Next, the pushing load of the caulking part 22 applied by the pushing jig is released. Thus, as shown in FIG. 2, the caulking part 22 slightly springs back. Thus, part of the circular disc spring 6 is detached from the base end surface 51 of the insulating member 5. That is, the circular disc spring 6 is deformed so that the outer periphery side thereof is slightly displaced to the base end side with respect to the inner periphery side. In other words, the circular disc spring 6 is deformed so as to be close to a free state (refer to FIG. 4 and FIG. 7) by restoring force thereof.

Accordingly, in the resultant gas sensor 1, as shown in FIG. 2, the wedge-shaped gap 14 is formed between the base end surface 51 of the insulating member 5 and the circular disc spring 6 on the outer periphery side of the tip end side pressing part 12.

Since the circular disc spring 6 in a compressive deformation state is interposed between the caulking part 22 and the base end surface 51 of the insulating member 5, the restoring force of the circular disc spring 6 can press the sealing member 4 to the base end side in the axial direction. In addition, the circular disc spring 6 is supported by the caulking part 22 and the insulating member 5 at the base end side pressing part 11 and the tip end side pressing part 12, respectively. Hence, the distance between supporting points of the circular disc spring 6 in the radial direction is ensured. Hence, when the distance between the caulking part 22 and the base end surface 51 of the insulating member 5 in the direction is changed, the restoring force of the circular disc spring 6, that is, change in axial force can be suppressed. For example, when the gas sensor 1 is continuously used in a high-temperature environment, it can be considered that sealing properties are degraded with time due to permanent set-in fatigue of the sealing member 4 or the like. In such a case, even when the distance between the caulking part 22 and the insulating member 5 in the axial direction is changed, change in pressing force of the circular disc spring 6 against the sealing member 4 can be suppressed. Accordingly, the sealing properties of the sealing member 4 can be easily prevented from lowering.

A tolerance of the pressing force for pressing the insulating member 5 on the tip end side in the axial direction by the circular disc spring 6 is appropriately set depending on strength of the insulating member 5, desired sealing properties, and other factors. As described above, since the circular disc spring 6 can decrease the change in restoring force thereof depending on the deformation amount in the axial direction, the above tolerance of the pressing force can be easily met. In addition, using the circular disc spring 6 described above can maintain sufficient pressing force against the sealing member 4 without performing a thermal caulking process.

Figure 6:
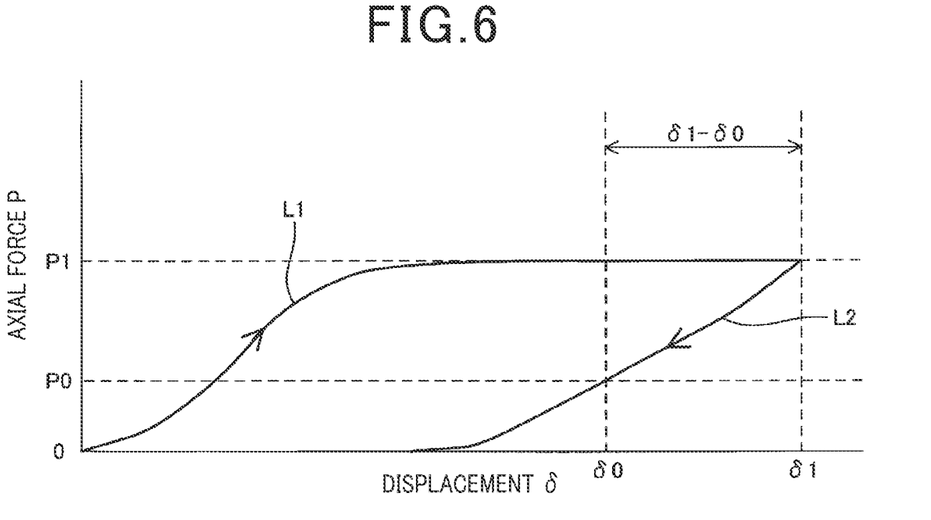
FIG. 6 is a diagram illustrating a relationship between axial force and displacement of the circular disc spring according to the first embodiment.

FIG. 6 illustrates an example of a relationship between axial force P and displacement δ of the circular disc spring 6. The displacement δ is a compression dimension in the axial direction from a free state of the circular disc spring 6. As illustrated by a relational curve L1 in FIG. 6, the axial force P gradually increases as the circular disc spring 6 is compressed from the free state shown in FIG. 7 (i.e., the displacement δ is increased). However, if the axial force P reaches a certain axial force P1, the axial force P does not increase even when the displacement δ is increased. Then, as shown in FIG. 5, the circular disc spring 6 is compressed until the circular disc spring 6 is subjected to surface contact with the base end surface 51 of the insulating member 5. That is, as shown in FIG. 8, the circular disc spring 6 is compressed until the circular disc spring 6 becomes a flat plate shape. The displacement δ at this time is defined as δ1. The broken lines shown in FIG. 8 indicate part of the outline of the circular disc spring 6 in a free state.

Thereafter, if the load in the axial direction is gradually decreased, the circular disc spring 6 is gradually restored. At this time, the axial force P decreases along a relational curve L2 between the axial force P and the displacement δ, which differs from the relational curve L1 when the circular disc spring 6 is subjected to compressive deformation. When the axial force P required for the sealing member 4 to be being sufficiently pressed is defined as P0 or more, as shown in FIG. 6, the displacement δ, which is displacement δ0 or more, at the intersection of a straight line P=P0 and the relational curve L2 is required. Hence, the range of the displacement δ of the circular disc spring 6 for maintaining the required axial force P is δ0 or more. The displacement δ cannot be more than δ1 described above. Hence, the displacement δ is set so as to be maintained within a range of δ0≤δ≤δ1.

The range of δ0 to δ1 (i.e., δ1-δ0) can be extended to some extent by using the circular disc spring 6 describe above. Accordingly, as described above, even if the distance between the caulking part 22 and the base end surface 51 of the insulating member 5 increases due to permanent set-in fatigue of the sealing member 4 or the like, the axial force P can be easily maintained in a range of the required axial force P0 or more.

Using the circular disc spring 6 described above can restrain the upper limit of the load when the circular disc spring 6 is subjected to compressive deformation at the time of assembly. Accordingly, the load on the assembly can be prevented from being excessive.

In the gas sensor 1, at least part of the base end side pressing part 11 is disposed between the inner periphery edge 511 and the outer periphery edge 512 of the base end surface 51 of the insulating member 5. Hence, when the gas sensor 1 is assembled, the circular disc spring 6 can be prevented from being locally pressed to a corner of the base end surface 51 of the insulating member 5, by the pressing force of the caulking part 22 for pressing the circular disc spring 6. Hence, the pressing force of the caulking part 22 can be great while the insulating member 5 is prevented from being damaged. Accordingly, the sealing properties of the sealing part can be easily improved.

The outer periphery edge 112 of the base end side pressing part 11 is formed on the outer periphery side with respect to the inner periphery edge 121 of the tip end side pressing part 12. The inner periphery edge 111 of the base end side pressing part 11 is disposed on the inner periphery side with respect to the outer periphery edge 512 of the base end surface 51 of the insulating member 5. Hence, the length of the caulking part 22 in the radial direction of the gas sensor 1 can be shortened. That is, the base end side pressing part 11 is located at a position in the vicinity of the outer periphery side. Thus, a withstand load of the caulking part 22 in the axial direction can be increased. Accordingly, the sealing properties can be easily improved.

The wedge-shaped gap 14 is formed between the circular disc spring 6 and the base end surface 51 of the insulating member 5 on the outer periphery side of the tip end side pressing part 12. Hence, a load can be prevented from being applied to the corner of the outer periphery edge 512 of the base end surface 51 of the insulating member 5. Accordingly, the insulating member 5 can be effectively prevented from being damaged.

In the present embodiment, the outer periphery edge 112 of the base end side pressing part 11 is disposed on the outer periphery side with respect to the outer periphery edge 512 of the base end surface 51 of the insulating member 5. Hence, change in axial force with respect to the deformation amount of the circular disc spring 6 in the axial direction can be small. Accordingly, change in a load applied to the sealing member 4 associated with change in a dimension between the insulating member 5 and the caulking part 22 in the axial direction can be suppressed more easily.

As described above, according to the present embodiment, a gas sensor can be provided in which sealing properties of a sealing part can be easily improved.

First Comparative Embodiment

Figure 9:
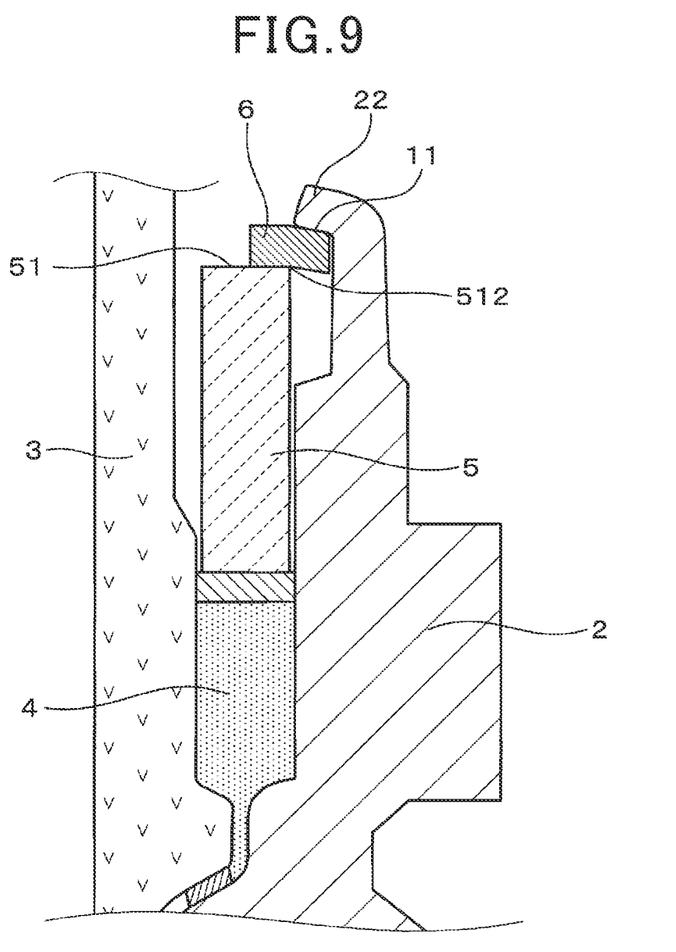
FIG. 9 is a sectional view of a portion in the vicinity of a sealing member according to a comparative embodiment.

In the present embodiment, as shown in FIG. 9, the base end side pressing part 11 is located on the outer periphery side with respect to the base end surface 51 of the insulating member 5.

That is, in the present embodiment, when viewed in the axial direction, the base end side pressing part 11 does not overlap with the base end surface 51 of the insulating member 5. In other words, a portion at which the caulking part 22 presses the circular disc spring 6 is located on the outer periphery side with respect to the outer periphery edge 512 of the base end surface 51 of the insulating member 5.

In such an embodiment, when the gas sensor is assembled, the caulking part 22 is deformed. When the circular disc spring 6 is pressed toward the tip end side, the circular disc spring 6 is pressed to the corner of the outer periphery edge 512 of the base end surface 51 of the insulating member 5. Thus, a large load is locally applied to the insulating member 5 easily. Hence, in order to prevent the insulating member 5 from being damaged at the time of assembly, pressing force of the caulking part 22 against the insulating member 5 is required to be suppressed. Accordingly, sealing properties of a sealing part are difficult to improve.

In contrast, in the above first embodiment, the circular disc spring 6 can be prevented from being locally pressed to the corner of the insulating member 5. Hence, pressing force of the caulking part 22 can be great while the insulating member 5 is prevented from being damaged. Accordingly, the sealing properties of the sealing part can be easily improved.

Second Embodiment

Figure 10:
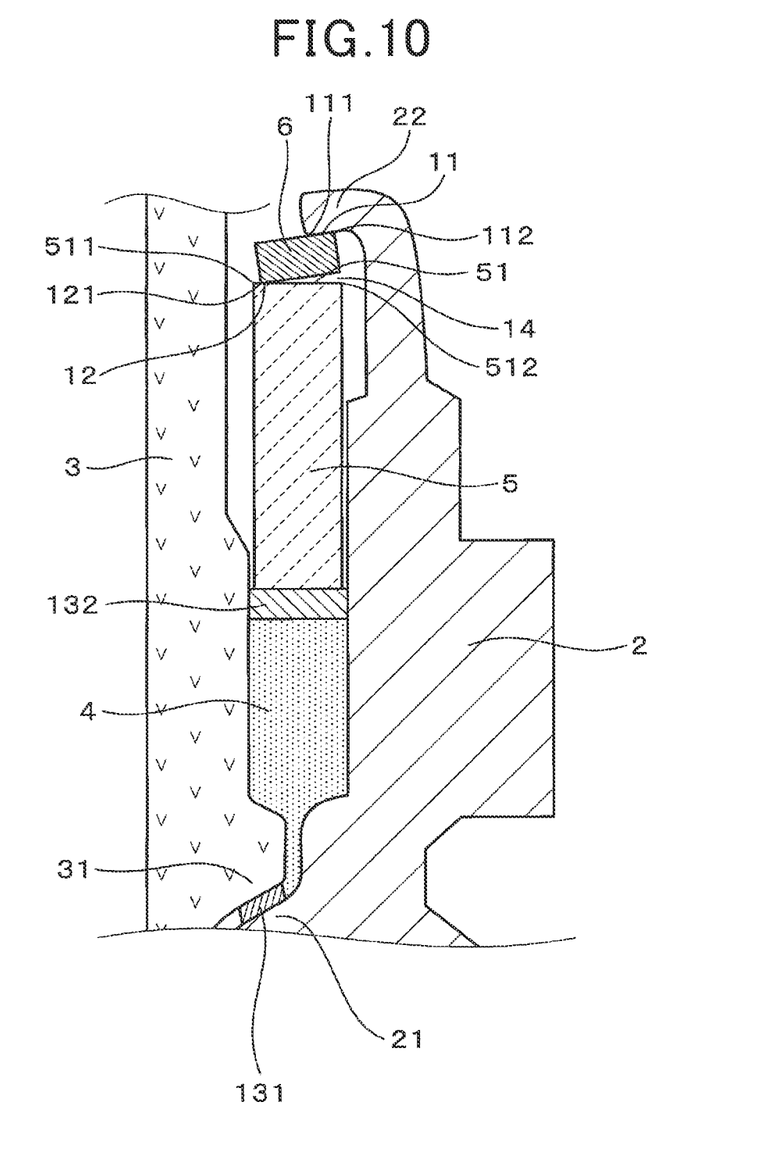
FIG. 10 is a sectional view of a portion in the vicinity of a sealing member according to a second embodiment.
Figure 11:
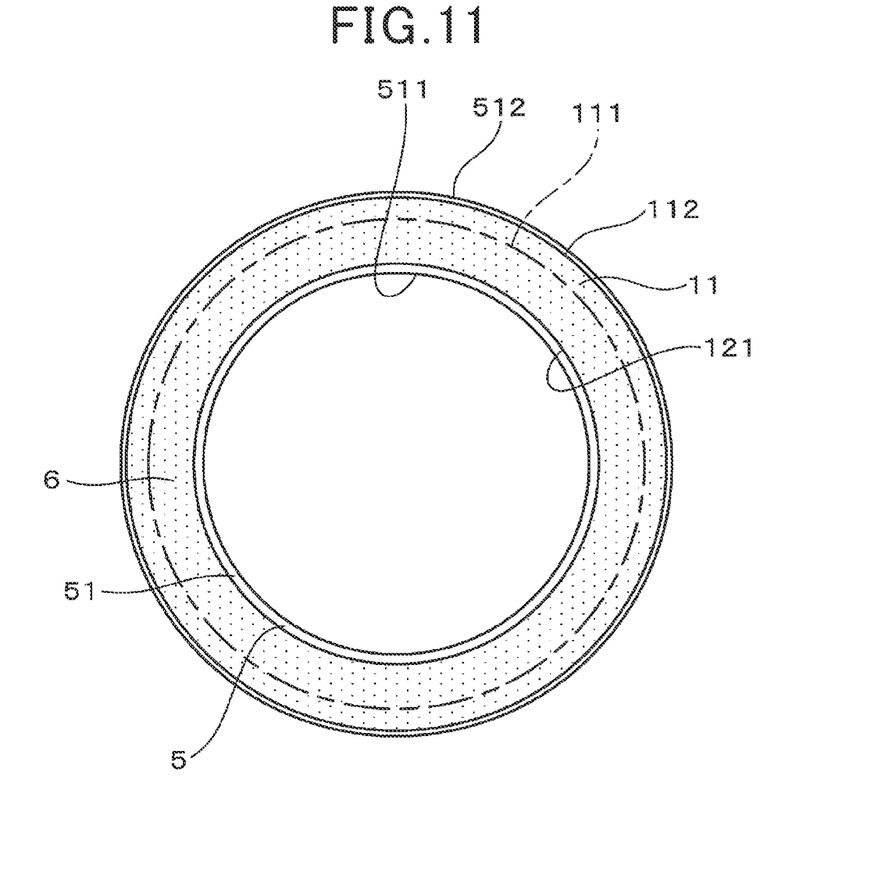
FIG. 11 is a view illustrating a positional relationship among a circular disc spring, an insulating member, and a base end side pressing part viewed in an axial direction according to the second embodiment.
Figure 12:
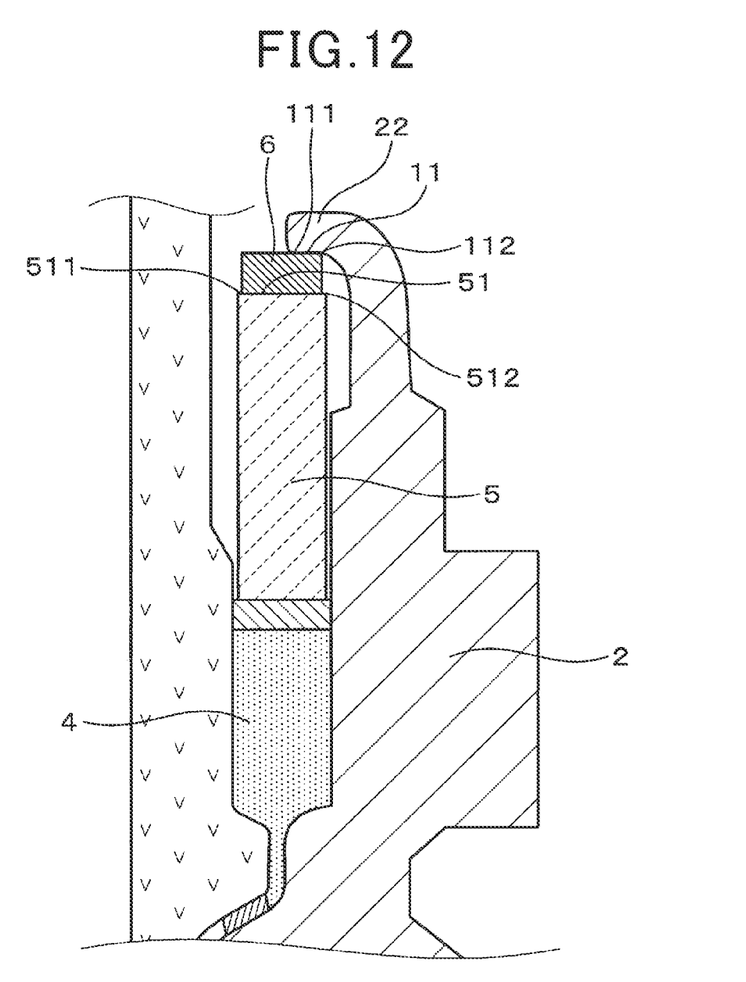
FIG. 12 is a sectional view illustrating a state in which a caulking part is pressed to a tip end side according to the second embodiment.

In the present embodiment, as shown in FIG. 10 to FIG. 12, when viewed in the axial direction, the circular disc spring 6 is disposed so that the whole of the circular disc spring 6 overlaps with the base end surface 51 of the insulating member 5.

In the present embodiment, the outer periphery edge 112 of the base end side pressing part 11 is located on the inner periphery side with respect to the outer periphery edge 512 of the base end surface 51 of the insulating member 5. The inner periphery edge 121 of the tip end side pressing part 12 is located on the outer periphery side with respect to the inner periphery edge 511 of the base end surface 51 of the insulating member 5.

Other configurations are similar to those in the first embodiment.

In the present embodiment, as shown in FIG. 12, even in a state in which the caulking part 22 presses the circular disc spring 6, a load can be further prevented from being applied to the corner of the outer periphery edge 512 of the base end surface 51 of the insulating member 5. Accordingly, the insulating member 5 is easily prevented from being damaged. Furthermore, axial force for pressing the insulating member 5 can be increased, whereby sealing properties of the sealing part can be easily improved.

In addition, effects similar to those of the first embodiment are provided. The reference numerals that are used in the second embodiment or the later embodiments and are same as those used in the foregoing embodiments indicate components and the like similar to those in the foregoing embodiments unless otherwise indicated.

Third Embodiment

Figure 13:
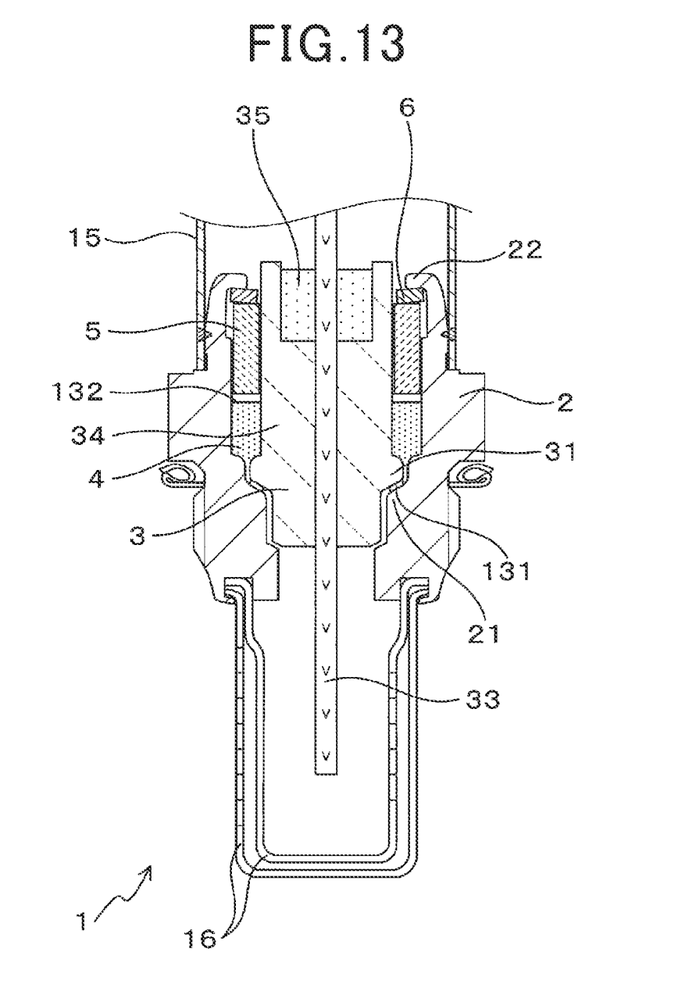
FIG. 13 is a sectional view of part of a gas sensor according to a third embodiment.

In the present embodiment, as shown in FIG. 13, the sensor body 3 includes a sensor element 33 and an insulator 34 that holds the sensor element 33.

The sensor element 33 is a laminated-type sensor element configured by laminating a plurality of ceramic layers including a solid electrolyte body. The insulator 34 holds the sensor element 33, which is inserted into the insulator 34 in the axial direction. A glass sealing part 35 is filled in a concave portion provided to the base end part of the insulator 34. The glass sealing part 35 seals a gap between the insulator 34 and the sensor element 33.

The locked part 31 is formed on the outer periphery of the insulator 34. That is, in the present embodiment, the locked part 31 provided to the insulator 34 is locked by the locking step part 21 of the housing 2. The sealing member 4, the second gasket 132, the insulating member 5, and the circular disc spring 6 are disposed between the outer periphery of the insulator 34 and the inner periphery of the housing 2. These members are caulked in the axial direction by the caulking part 22, and the sealing member 4 is pressed by axial force of the circular disc spring 6.

Other configurations are similar to those in the first embodiment.

Also according to the present embodiment, similarly to the first embodiment, a gas sensor can be provided which easily improve sealing properties of a sealing part. In addition, effects similar to those of the first embodiment are provided.

Figure 14:
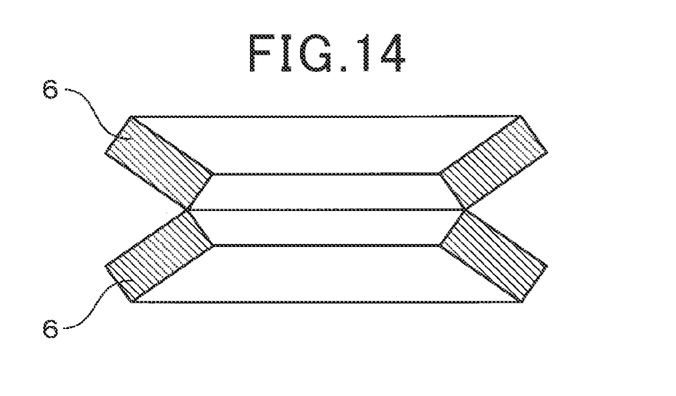
FIG. 14 is a sectional view illustrating a state in which two circular disc springs are stacked.

In the above embodiment, one circular disc spring 6 is interposed between the insulating member 5 and the caulking part 22. However, two or more stacked circular disc springs 6 may be disposed. In this case, for example, as shown in FIG. 14, the circular disc springs 6 are preferably stacked and arranged so as to be inclined in the directions opposite to each other. Thus, the ratio of change in axial force to displacement of the circular disc springs 6 can be controlled. That is, the value corresponding to (δ1−δ0) shown in FIG. 6 can be increased. Accordingly, the sealing properties can be prevented from being lowered more effectively. In this case, the outer periphery edge of the circular disc springs 6 is disposed inside with respect to the outer periphery edge 512 of the base end surface 51 of the insulating member 5.

In the above embodiment, the circular disc spring 6 is inclined, in a free state, toward the base end side from the inner periphery side to outer periphery (refer to FIG. 4 and FIG. 7). However, the circular disc springs 6 may be inclined in the direction opposite to the above. Also in this case, at least part of the base end side pressing part is disposed between the inner periphery edge and the outer periphery edge of the base end surface of the insulating member.

The present disclosure is not limited to the above-described embodiments and can be applied to various embodiments within a scope not deviating from the gist of the present disclosure.

The present disclosure has so far been described based on some embodiments. However, the present disclosure should not be construed as being limited to these embodiments or the structures. The present disclosure should encompass various modifications, or modifications within the range of equivalence. In addition, various combinations and modes, as well as other combinations and modes, including those which include one or more additional elements, or those which include fewer elements should be construed as being within the scope and spirit of the present disclosure.

An aspect of the present disclosure provides a gas sensor (1) that includes:
- a housing (2) that includes a locking step part (21) formed on an inner periphery of the housing;
- a sensor body (3) that includes a locked part (31) locked to the locking step part from a base end side and is held inside the housing;
- a sealing member (4) that is filled between the inner periphery of the housing and an outer periphery of the sensor body on the base end side of the locked part;
- an insulating member (5) that is disposed between the inner periphery of the housing and the outer periphery of the sensor body on the base end side of the sealing member; and
- a circular disc spring (6) that presses a base end surface (51) of the insulating member, wherein
the housing includes a caulking part (22) that caulks the circular disc spring so as to cover the circular disc spring from the base end side,
the circular disc spring is disposed between the caulking part and the insulating member in a state in which the circular disc spring is elastically compressed,
at least part of a base end side pressing part (11), at which the caulking part presses the circular disc spring, is disposed between an inner periphery edge (511) and an outer periphery edge (512) of the base end surface of the insulating member,
an outer periphery edge (112) of the base end side pressing part is formed on an outer periphery side with respect to an inner periphery edge (121) of a tip end side pressing part (12) at which the circular disc spring presses the base end surface of the insulating member, and
an inner periphery edge (111) of the base end side pressing part is disposed on an inner periphery side with respect to the outer periphery edge of the base end surface of the insulating member, and a wedge-shaped gap (14) is formed between the circular disc spring and the base end surface of the insulating member on the outer periphery side of the tip end side pressing part.

In the above gas sensor, at least part of the base end side pressing part is disposed between the inner periphery edge and the outer periphery edge of the base end surface of the insulating member. Hence, when the gas sensor is assembled, the circular disc spring can be prevented from being locally pressed to a corner of the base end surface of the insulating member, by pressing force of the caulking part for pressing the circular disc spring. Hence, the pressing force of the caulking part can be great while the insulating member is prevented from being damaged. Accordingly, the sealing properties of the sealing part can be easily improved.

As described above, according to the aspect, a gas sensor can be provided in which sealing properties of a sealing part can be easily improved.

What is claimed is:

1. A gas sensor, comprising:
a housing that includes a locking step part formed on an inner periphery of the housing;
a sensor body that includes a locked part locked to the locking step part from a base end side and is held inside the housing;
a sealing member that is filled between the inner periphery of the housing and an outer periphery of the sensor body on the base end side of the locked part;
an insulating member that is disposed between the inner periphery of the housing and the outer periphery of the sensor body on the base end side of the sealing member; and
a circular disc spring that presses a base end surface of the insulating member, wherein
the housing includes a caulking part that caulks the circular disc spring so as to cover the circular disc spring from the base end side,
the circular disc spring is disposed between the caulking part and the insulating member in a state in which the circular disc spring is elastically compressed,
at least part of a base end side pressing part, at which the caulking part presses the circular disc spring, is disposed between an inner periphery edge and an outer periphery edge of the base end surface of the insulating member,
an outer periphery edge of the base end side pressing part is formed on an outer periphery side with respect to an inner periphery edge of a tip end side pressing part at which the circular disc spring presses the base end surface of the insulating member, and
an inner periphery edge of the base end side pressing part is disposed on an inner periphery side with respect to the outer periphery edge of the base end surface of the insulating member, and
a wedge-shaped gap is formed between the circular disc spring and the base end surface of the insulating member on the outer periphery side of the tip end side pressing part.

2. The gas sensor according to claim 1, wherein when viewed in an axial direction, the circular disc spring is located so that the whole of the circular disc spring overlaps with the base end surface of the insulating member.

3. The gas sensor according to claim 1, wherein:
the circular disk spring is a first circular disk; and
wherein a second circular disc spring is inclined with respect to the first circular disc spring and is disposed adjacent to said first circular disc spring.

4. The gas sensor according to claim 1, wherein:
a radially-outer peripheral surface of the circular disk spring is farther away from the base end surface of the insulating member than a radially-inner peripheral surface of the circular disk spring in an axial direction of the gas sensor.

* * * * *